United States Patent [19]

Schaub

[11] Patent Number: 5,293,851
[45] Date of Patent: Mar. 15, 1994

[54] COMBUSTION SYSTEM FOR GAS ENGINE OTHER THAN DUAL FUEL ENGINE

[75] Inventor: Frederick S. Schaub, Mt. Vernon, Ohio

[73] Assignee: Cooper Industries, Inc., Houston, Tex.

[21] Appl. No.: 869,759

[22] Filed: Apr. 16, 1992

[51] Int. Cl.⁵ .................... F02B 19/10; F02B 19/12
[52] U.S. Cl. .................... 123/259; 123/260; 123/256; 123/275
[58] Field of Search .......... 123/260, 261, 275, 27 GE, 123/526, 257, 259, 256

[56] References Cited

U.S. PATENT DOCUMENTS

| | | | |
|---|---|---|---|
| 3,140,697 | 7/1964 | Peras | 123/275 X |
| 3,954,088 | 5/1976 | Scott | 123/275 X |
| 4,186,692 | 2/1980 | Kawamura et al. | 123/275 X |
| 4,323,039 | 4/1982 | Tsuugekawa et al. | 123/275 |
| 4,966,103 | 10/1990 | Schaub et al. | 123/276 |

Primary Examiner—Tony M. Argenbright
Attorney, Agent, or Firm—Laff, Whitesel, Conte & Saret

[57] ABSTRACT

A combustion system for gas, non-dual-fuel engines utilizes a torch cell having a glow plug and a fuel injector. Pilot fuel is directed to the surface of the glow plug and main fuel is supplied to the torch cell. Reduced compression ratios are permitted, enabling use of low octane gaseous fuels and starting without assist from main chamber diesel operation.

13 Claims, 3 Drawing Sheets

COMBUSTION SYSTEM FOR GAS ENGINE OTHER THAN DUAL FUEL ENGINE

This invention relates to an improved combustion system for gas engines, other than dual fuel engines.

BACKGROUND OF THE INVENTION

Stationary reciprocating engines operating on natural gas or other gaseous fuels use energy for ignition from a spark or from a small pilot quantity (typically five percent of the total fuel) of a liquid fuel having an adequate cetane number (typically diesel fuel oil) injected directly into the combustion chamber. The pilot ignited engines serve the major industrial markets since they exceed the spark ignited engines in durability and rating capability and offer convertibility to and from full diesel fueling while in operation. These pilot ignited engines are referred to as "gas diesel" or "dual fuel" engines.

Typical dual fuel engines are evidenced by U.S. Pat. Nos. 4,603,674 to Tamaka; 4,463,734 to Akeroyd; and 4,527,516 to Foster.

Control of engine emissions, particularly NO emissions, has become a concern as evidenced by U.S. Pat. Nos. 4,306,526 to Schaub et al; 4,524,730 to Doell et al; and my own patent 4,966,103, jointly held with Jesse G. Smith, and assigned to the assignor of the present invention, which provided an auto-ignition chamber or torch cell for dual fuel engines in the pilot oil mode. This system improved the exhaust emissions by provision of an externally disposed fluid fuel torch cell assembly that is in communication with the main piston chamber, such a cell providing means for optimum ignition of the main chamber fuel lean gaseous fuel mixture at the time of maximum efficiency near the top of the compression stroke. It is, however, primarily a dual fuel engine.

SUMMARY OF THE INVENTION

An object of the present invention is to provide an improved combustion system for a gas engine that permits engine starting without assist from main chamber diesel operation.

A further object of the present invention is to allow use of reduced compression ratios to accommodate low octane gaseous fuels presently unsuited to the high compression dual fuel engines.

Another object is to utilize a conventional design glow plug for startup.

Still another object is to utilize a pilot nozzle having the capability to direct pilot fuel to the surface of the glow plug in addition to directing the main quantity of pilot fuel to the torch cell. A gland nut is preferably utilized to secure the pilot nozzle to thereby permit aiming of a secondary lateral nozzle flow to the glow plug surface.

A still further object of the invention is to provide an uncooled nose on the torch cell to facilitate the provision of the required heat sink characteristics for efficient operation thereof.

Other objects will become apparent to those skilled in the art when the specification is read in conjunction with the drawings.

DETAILED DESCRIPTION OF THE PREFERRED EMBODIMENT

Figure 2:
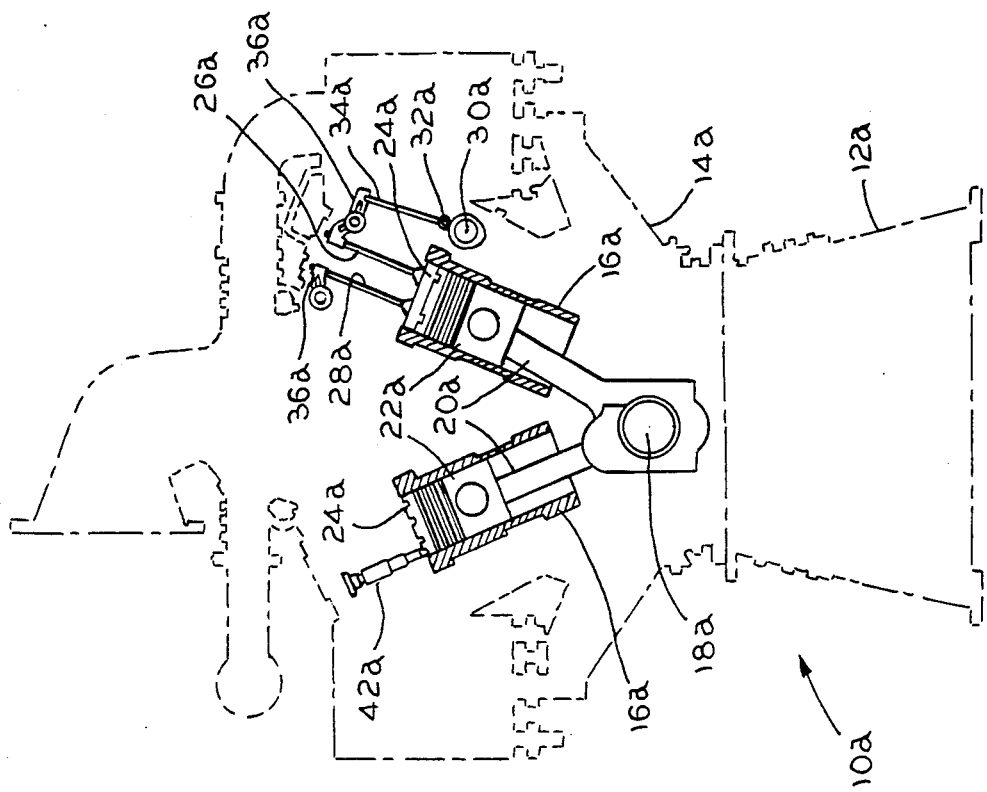
FIG. 2 is a transverse elevational view in partial cross-section of a similar lighter weight engine for standby duty, offshore and marine applications, that operates at a slightly higher speed.
Figure 1:
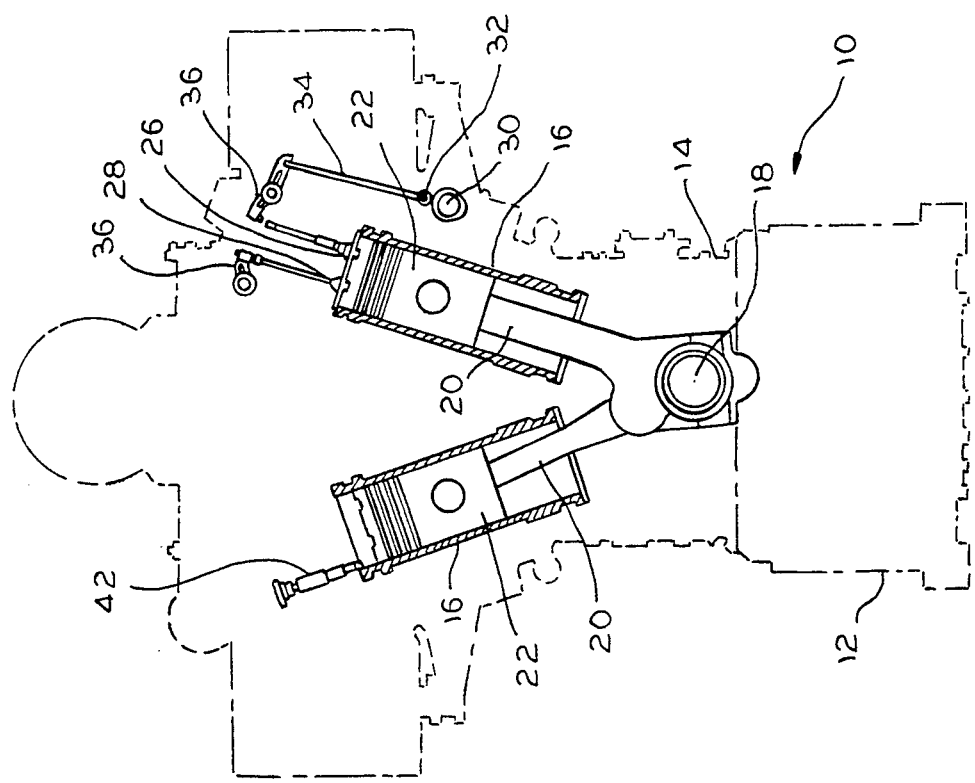
FIG. 1 is a transverse elevational view in partial cross-section of a typical V-type, four-cycle engine design engineered for high-horsepower, continuous duty operation that can utilize the present invention.

Referring now to the drawings, particularly FIGS. 1 and 2, wherein similar parts are designated by similar numerals, in FIG. 1 a typical engine 10 of the type with which the present invention is contemplated to be used includes a base 12 that supports a centerframe 14 on which is mounted a plurality of cylinders blocks 16 disposed in a spaced "V" arrangement relative to said centerframe. Preferably, said base, said centerframe and said plurality of cylinder blocks are each manufactured in one piece to provide maximum rigidity and permanent alignment when joined. An axially disposed power crankshaft 1 is mounted in said centerframe, supported by suitable bearings along its length, and is joined by connecting rods 20 to complimentary pistons 22 each disposed within the bore of a cylinder block 16. Each cylinder is blocked at its upper end by a suitable head that normally includes two inlet valves 26 and two exhaust valves 28, preferably, the valve seats are of the insert type and made of high-heat-resistant material. The valves are operated by suitably timed camshafts 30 engaging cam rollers 32 having pushrods 34 and acting through rockers 36, or other suitable means, to actuate the valves in timed relation. There is also the torch cell 42 of the present invention that is capable of starting the single fuel gaseous engine contemplated. The various parts of the lighter duty engine in FIG. 2 are designated by similar numerals with the addition of the suffix "a". My torch cell of the present invention is mainly applicable for any type of large reciprocating engines whether stationary or mobile. The large engines provide the best economics of our invention with regard to efficiency.

Figure 3:
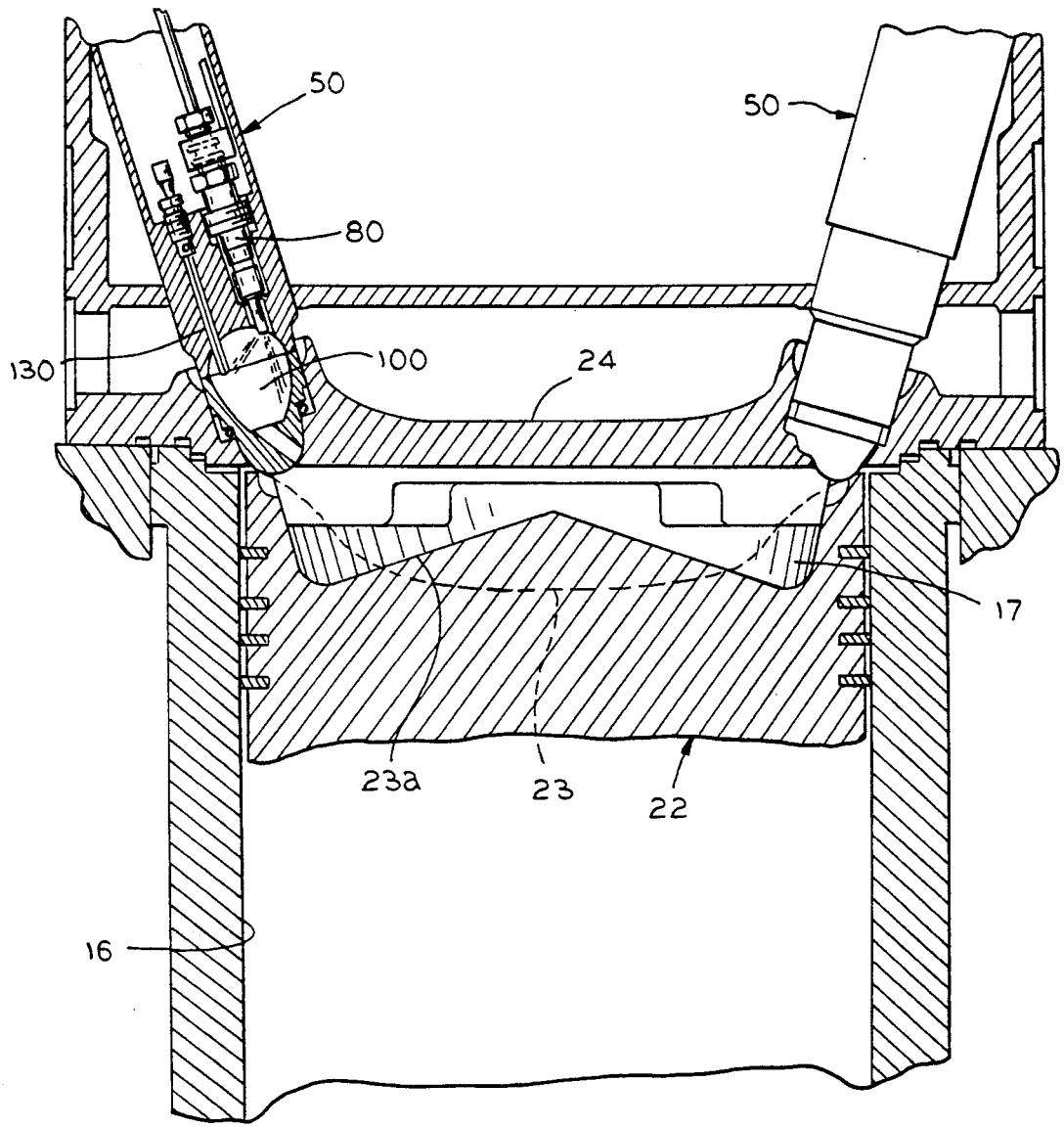
FIG. 3 is a schematic partial cross-section of a combustion chamber incorporating the improved torch cell assembly, embodying the teachings of the present invention, for use in the fuel gas mode of operation.
Figure 4:
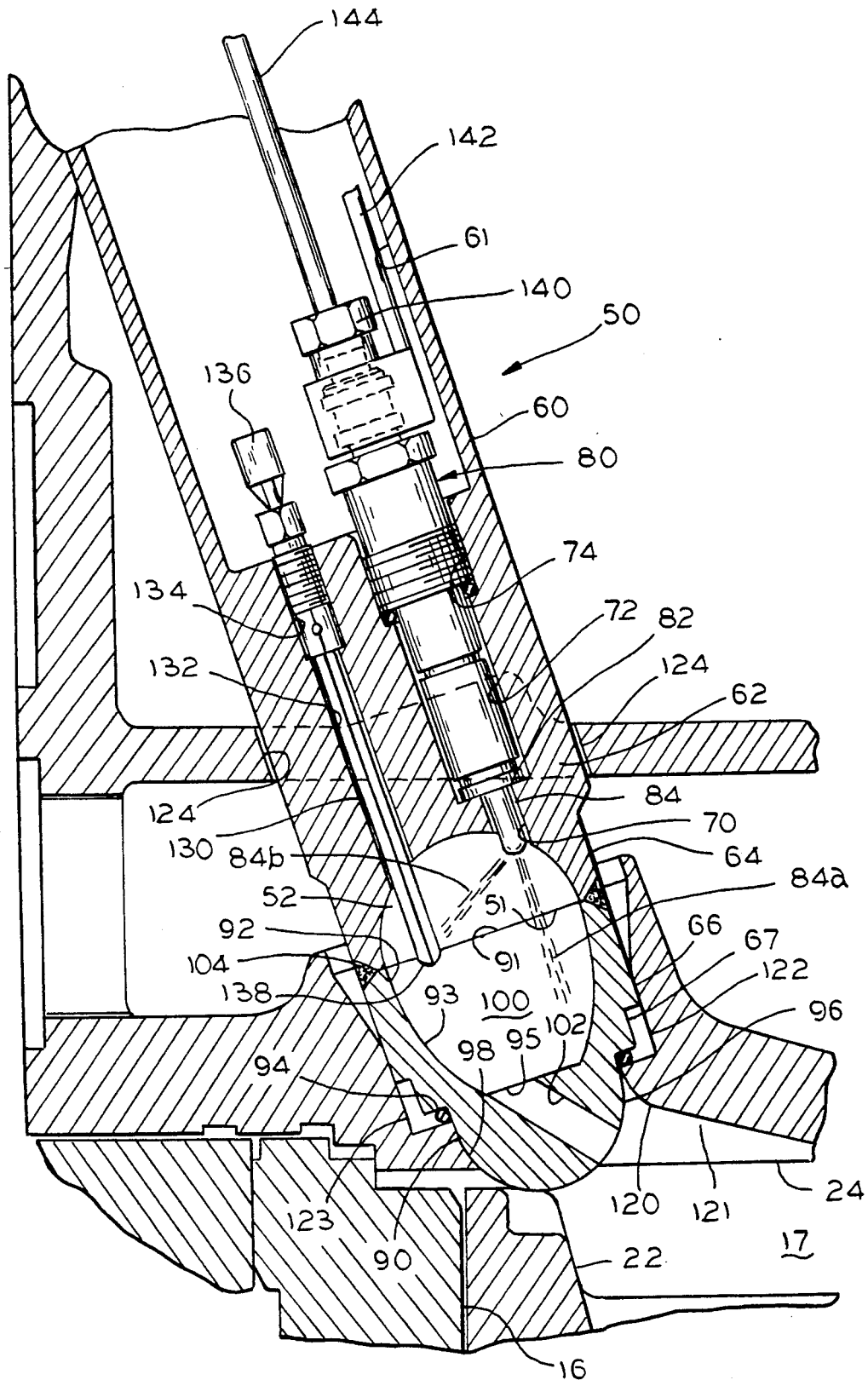
FIG. 4 is an enlarged elevation view in partial section of the torch cell in FIG. 3.

Referring to FIGS. 3 and 4, my invention is illustrated by a four-cycle engine cylinder which is normally fueled by gaseous fuel and has at least one torch cell assembly 50, there being two torch cells 50 shown, that are ignited by a relatively small quantity of liquid pilot fuel. The torch cell ignition chamber 100 is generally a segmented-sphere paraboloid shape and usually the volume would typically represent one to five percent of the volume of the main chamber 17 defined by the piston 22, the cylinder head 24 and the walls of the cylinder 16 at the top of the piston's stroke, however, the size of the ignition chamber 100 can run as high as twenty-five percent of the volume of the main cylinder chamber 17, in a small engine, when the stroke is at its uppermost position. Such a torch cell chamber 100 would provide adequate delivery of thermally and chemically active species to ignite the fuel lean contents of the main chamber 17. (Lean burning is an effective control mechanism for certain emissions, including oxides of nitrogen particularly from gaseous fuel.)

Referring now to FIG. 4, which is an enlarged view of the showing of the torch cell assembly 50 shown in FIG. 3; the assembly 50 includes a generally tubular injector body 60 having a solid end portion 62 that is annularly relieved in spaced portions, as at 64 and 68, to present an annular shoulder 66 forming a radial abutment 67, for purposes set forth hereinafter. The free end of the solid portion 62 is provided with a generally segmented spherical cavity 52 having the segment portion 51 preferably at the center of the sphere, i.e., being a hemispherical cavity 52, and having a predetermined volume for the particular engine with which it is to be associated. The cavity 52 is generally symmetrical about the axis of the tubular body 60 and communicates with the interior of tubular body 60 by means of an angularly disposed passageway 70 that is double counterbored as at 72 and 74 and opening outwardly into the interior cavity or chamber 61 of the tubular body 60 away from the cavity 52.

The geometry of the torch cell chamber may be configured to include a shelf or pocket to control vaporization, mixing and ignition.

An injector 80 is threaded into counterbore 74, seated against sealing means 82 located at the base of counterbore 72 and includes a spigot or nozzle 84 extending into passageway 70. The injector 80 is disposed slightly off-center relative to the coaxial disposition of the body 60 and cavity 52 so that the passageway 70 enters the cavity 52 slightly off of being tangential thereto.

The injector 80 is a multi-hole injector, as shown, with an axially disposed single hole pintle nozzle forming an axially extending stream 84a and a laterally extending stream 84b, for purposes best set forth hereinafter.

On the opposite side of the center line of body 60 and generally parallel to injector 80 is a glow plug 130 screwed into the counterbored portion 134 of bore 132, with an exposed tip portion 138 extending a substantial distance into chamber 100. The opposite end of glow plug 130 is provided with a connector 136, extending into chamber 61 of body 60, and adapted to accept a mating connector connected to a power source (not shown).

A nozzle 90 having a laterally extending undercut and chambered head 92 presents a narrow rim-like edge 94, for sealing engagement as set forth hereinafter, and includes a segmented paraboloid cavity 93 that is complimentary to the cavity 52 at its straight parabolic end 91 and has its segment portion 95 at its other end. The cavities 52 and 93 are combined to form a generally segmented-sphere paraboloid chamber 100.

The external configuration of the body of nozzle 90 extending down from head 92 is double tapered to provide frusto-conical portion 96 and conical tip 98. Cavity 93 communicates with the cone 98 by means of the passageway 102 that is substantially tangentially disposed relative to the surface of cavity 93 and generally perpendicular to the generated surface of cone 98. The passageway 102 is slightly elevated away from the tangential line falling on the segmented spherical cavity formed in the end of the piston 22 when it is in the uppermost position of the stroke.

The nozzle 90 is joined with the free end of solid portion 62 by means of a bead of welding or brazing 104 filling the chamfered outside edge of their mating end and head surfaces.

The cylinder head 24 is provided with an angularly disposed passage 120 having an axially spaced counterbored seat 122 in passage 123 against which the nozzle head rim 94 will sealing engage and an additional axially spaced passage 124 for supporting and aligning the tubular body 60. The shoulder means 66 can be press fit into passage 123 and preferably is provided suitable means, not shown, for orienting the passage 102 relative to the main cylinder chamber 17. Similarly, the tapered portion 96 is brought to bear on the sharp edge defined by the intersection of passageway 120 and the counterbore seat 122.

A portion of the surface of the head 24 connected to passageway 120 is shaped to form a tapered groove 121. The nozzle passageway 102 points toward the tapered groove 121.

The fuel cell 50 is an auto-ignition fuel cell in which every time the nozzle 84 directs a stream 84a into the chamber 100 the nozzle 84 also directs a lateral stream 84b into contact with glow plug 130 and its hot tip 138. The gland nut means 140 permits the control rod 142 to control the radial disposition of nozzle 84 to insure accurate directional control of the stream 84b to insure its contact with tip 138 of glow plug 130 with supply line 144 remaining coaxially disposed during such adjustments.

This invention can also be utilized on a two cycle engine as well as a four cycle engine. The cetane rating of the liquid fuel should be such that it will ignite under a predetermined temperature. The gas mixture self ignition characteristic is such that it would not ignite under such predetermined pressure alone and therefore, it is necessary to utilize the liquid fuel torch cell. While connected by the communicating bore 102 between the chamber 100 and the main piston chamber 17 the torch cell receives the hot compressed fuel gas and air mixture from the compression stroke of the piston 22 and these are brought into the chamber 100 in a swirling flow by the tangential disposition of the bore 102, the liquid fuel is introduced transversely along stream 84b and axially along stream 84a into the flow of compressed fuel gas/air mixture initially introduced through intake valve 26, and will ignite when stream 84b contacts either the-glow plug tip 138 or the wall of chamber 100 and will immediately flow chemically and thermally active gases out the bore 102 and serve to ignite the compressed gaseous fuel in the main chamber 17.

An important application of the invention is to allow use of lower engine compression ratios to accommodate sensitive fuel (low octane). Other variations and mechanical equivalents will become apparent to those skilled in the art when this specification is read in conjunction with the appended claims and the intent is for such claims to be read as broadly as permitted by existing art.

I claim:

1. An improved combustion system for an internal combustion engine having at least one cylinder wherein said at least one cylinder has operatively connected thereto a piston, at least one inlet valve, at least one exhaust valve, a fuel torch cell, and a first fuel injector with said torch cell being adapted to be operatively connected to said at least one cylinder, said system including:

an auto-ignition chamber defined by said torch cell and having a torch cell nozzle at one end thereof and the other end having appropriate means to connect a fuel injector mounted in said torch cell, with said fuel injector being in operative communication with said auto-ignition chamber and having a plurality of orifices opening into said chamber, a glow plug extending into said torch cell and chordally spaced from and aligned with one of said orifices, and a torch nozzle passage connecting said auto-ignition chamber with said cylinder at a predetermined angle to a top inner portion of a cylinder head closing said cylinder, and wherein said fuel injector and said glow plug extend into said autoignition chamber in generally aligned but spaced relation, further, said fuel injector has one of said orifices adapted to inject fuel into said chamber in a generally axial direction while a second of said orifices is adapted to spray fuel in the direction of said glow plug, with said fuel injector being provided with means for controlling the direction of said second orifice.

2. An improved combustion system for an internal combustion engine as claimed in claim 1 wherein said injector nozzle is retained in axial and rotational position by an adjustable gland nut which permits aiming of said nozzle directly at said glow plug.

3. An improved combustion system for an internal combustion engine as claimed in claim 1 wherein said auto-ignition chamber has a volume not to exceed 25% of the volume of a main piston chamber measured when a piston in the piston chamber is at the top of said piston's stroke.

4. An improved combustion system for an internal combustion engine having at least one cylinder wherein said at least one cylinder has operatively connected thereto a piston, at least one inlet valve, at least one exhaust valve, a fuel torch cell, and a first fuel injector with said torch cell being adapted to be operatively connected to said at least one cylinder, said system including: an auto-ignition chamber defined by said torch cell and having a torch cell nozzle at one end thereof and the other end having appropriate means to connect a fuel injector mounted in said torch cell, with said fuel injector being in operative communication with said auto-ignition chamber and having a plurality of orifices opening into said chamber, a glow plug extending into said torch cell and chordally spaced from and aligned with one of said orifices, and a touch nozzle passage connecting said auto-ignition chamber with said cylinder at a predetermined angle to a top inner portion of a cylinder head closing said cylinder, and wherein said fuel injector and said glow plug extend into said autoignition chamber in generally aligned but spaced relation, further, said fuel injector has one of said orifices adapted to inject fuel into said chamber in a generally axial direction while a second of said orifices is adapted to spray fuel in the direction of said glow plug, with said fuel injector being provided with means for controlling the direction of said second orifice, further, wherein said engine utilizes a low cetane gaseous fuel mixture.

5. An improved combustion system for an internal combustion engine as claimed in claim 4 wherein said fuel cell utilizes a liquid fuel, said liquid fuel capable of ignition upon contact with an active glow plug.

6. An improved combustion system for an internal combustion engine as claimed in claim 5 wherein said liquid fuel is fuel oil having a cetane rating such that it will auto-ignite at a predetermined pressure and temperature.

7. An improved combustion system for an internal combustion engine as claimed in claim 6 wherein the cetane rating of said gaseous mixture is such that it would not ignite at said predetermined pressure alone.

8. An improved combustion system for an internal combustion engine as claimed in claim 7 wherein said fuel oil would not ignite at said predetermined pressure alone.

9. An improved combustion system for an internal combustion engine as claimed in claim 8 wherein said fuel oil will only ignite when brought into contact with said chordally spaced glow plug and ejected from said fuel injector.

10. An improved combustion system for an internal combustion engine as claimed in claim 4 wherein said auto-ignition chamber has a volume not to exceed 25% of the volume of a main piston chamber measured when a piston in the piston chamber is at the top of said piston's stroke.

11. An improved method of combustion for a gas fuel reciprocating engine including the steps of emitting a gaseous fuel mixture into the chamber of a cylinder of said engine, compressing said gaseous fuel mixture by means of a reciprocating piston within said cylinder, igniting said compressed fuel mixture at the top of the compression stroke within said cylinder chamber by means of a liquid fuel torch cell disposed externally of said cylinder, said torch cell including port means that communicates with the said cylinder chamber, including the step of introducing a portion of said compressed gaseous mixture into said torch cell via said port means, said liquid fuel being injected by suitable means into said torch cell when said piston reaches said top of said compression stroke, a glow plug chordally spaced from said injection means, said injection means adapted to provide a plurality of orifices with one of said orifices adapted to emit a stream of liquid fuel into contact with said glow plug thereby causing ignition of said liquid fuel and ignition of said compressed gaseous mixture in said cylinder chamber via said port means.

12. An improved method as claimed in claim 11 wherein said gaseous mixture in said cylinder chamber is a fuel lean mixture to control exhaust emissions of said mixture.

13. An improved method as claimed in claim 12 wherein said fuel mixture in said torch cell is a liquid fuel rich mixture to insure complete combustion of said liquid fuel mixture as well as ensure complete ignition and combustion of said fuel lean mixture in said cylinder chamber.

* * * * *